May 4, 1926.

R. WILSON

REFRIGERATED BUTTER CUTTING MACHINE

Filed March 2, 1925 2 Sheets-Sheet 1

1,583,637

WITNESSES

INVENTOR
Reginald Wilson,
BY
ATTORNEYS

May 4, 1926.  
R. WILSON  
1,583,637  
REFRIGERATED BUTTER CUTTING MACHINE  
Filed March 2, 1925  2 Sheets-Sheet 2

WITNESSES

INVENTOR  
Reginald Wilson,  
BY  
ATTORNEYS

Patented May 4, 1926.

1,583,637

UNITED STATES PATENT OFFICE.

REGINALD WILSON, OF NEW YORK, N. Y.

REFRIGERATED-BUTTER-CUTTING MACHINE.

Application filed March 2, 1925. Serial No. 12,635.

*To all whom it may concern:*

Be it known that I, REGINALD WILSON, a citizen of the United States of America, and resident of the city of New York, borough of Manhattan, in the county of New York and State of New York, United States of America, have invented a new and Improved Refrigerated-Butter-Cutting Machine, of which the following is a full, clear, and exact description.

This invention relates to machines for cutting uniform blocks or pats of butter from a large print or bar, the same being more particularly designed for use in restaurants, lunch rooms, large boarding houses or other public eating places.

The invention primarily contemplates a machine which constitutes a sanitary means for expeditiously cutting individual pats or blocks of butter from a large block or print; which further serves as a means for remolding scraps of butter into blocks or prints for subsequent cutting and which still further serves as a convenient means for storing a supply of butter to be cut by the machine, whereby the same will be maintained at the proper temperature to prevent spoiling and to maintain its solidity.

Some of the principal objects of the present invention are to provide a butter cutting machine of the character set forth which is strong and durable, simple in its construction and mode of operation and which is highly efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
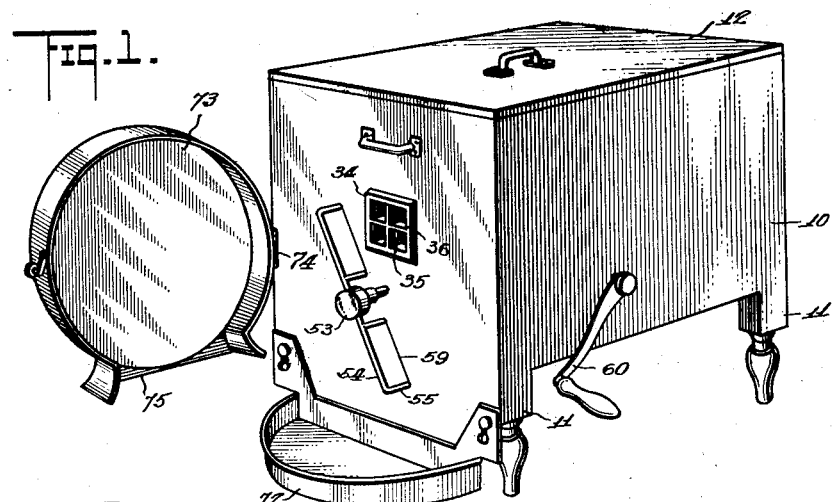
Figure 1 is a perspective view of a machine constructed in accordance with the invention with the cover for the rotary transverse cutting knife swung to an open position.

Referring to the drawings by characters of reference the machine includes a substantially rectangular body 10 having depending supporting legs 11 and provided with an open upper end which is closed by a removable cover 12. The body 10 is provided with a bottom 13 and its forward end wall 14 is provided with an opening 15 in the transverse center thereof and having its bottom edge substantially in alinement with the bottom 13. The body 10 is adapted to receive a partitioning element designated generally by the reference character 16 which element includes a bottom wall 17 and side and end walls 18 and 19 which conform generally to the size and configuration of the interior of the body. The forward end wall 19 is formed with an opening 20 at the transverse center thereof and adjacent the bottom wall 17, said opening being of the same general configuration and size as the opening 15 in order to register therewith when the partitioning element is in place within the body. A longitudinally central transverse partition 21 is provided in the partitioning element and a pair of longitudinal transversely spaced parallel partition walls 22 spaced apart the width of the opening 20 are provided, the same having outwardly flared upper ends 23. A vertical partition 24 disposed slightly in advance of the partition 21 defines together with the partitions 22 and the bottom wall 17 a compartment 25 of a size to approximately receive a pound print or block of butter while compartments 26 are defined between the side walls 18, partitions 22, the bottom wall 17, the partition 21 and the forward end wall 19 for ice or any other suitable refrigerant. The rear end wall 19 is cutaway or notched from its lower edge and the partition 21 correspondingly notched or cutaway from its lower edge and vertical side walls 27 extend from a correspondingly cutaway portion of the bottom wall 17 to the upper ends of the notches. A horizontal wall 28 extends between the rear end wall 19, the partition 21 and the upper edges of the walls 27. The partition walls 22 are provided with longitudinal guide slots 29 in the opposing inner faces thereof disposed in horizontal alinement with the underside of the horizontal wall 28, said guide slots or grooves being substantially flush with the upper edge of the partition 24 so as to accommodate a longitudinally slidable cover plate 30 which may be shifted from a position underlying the horizontal wall 28 to a position to overlie the compartment 25. The side partition walls 22 are further provided adjacent their juncture with the forward end wall 19 with vertical guide grooves 31 in which a vertically slidable closure plate 32 is guided so that the same may be moved downwardly to a position to close the opening 20 for a purpose to be hereafter set forth. The front end wall 14 is provided with a covering plate 33 preferably of sheet metal which is formed with an outwardly projecting boss 34 having an opening conforming substantially in size to the openings 15 and 20 and having mounted therein vertical and horizontal crossed knives 35 and 36 for equally subdividing the print of butter which is extruded or forced from the compartment 25 through the openings 20 and 15.

The means for forcing or extruding the butter through the openings and for subdividing the same by the crossed knives 35 and 36 consists of a movable follower or pusher member 40 which is provided in its forward face with intersecting crossed grooves 41. The rear face of the follower or pusher member 40 is provided with a boss 42 having a socket or opening 43 which receives the forward end of a plunger rod 44 extending through an aperture 45 in the partition 24 which forward end of the plunger 44 is detachably connected to the socket by a retaining screw 45ᵃ. The plunger rod 44 is provided with a downwardly extending arm 46 which is connected to a rack bar 47 movable in a guide 48 on the underside of the bottom 13. The rack bar meshes with a pinion 49 secured to a transverse countershaft 50 mounted in suitable bearings 51 attached to the bottom 13 of the body 10.

In order to provide means for cutting the extruded subdivided end of the print of butter, a rotary knife 52 is employed which consists of a hub 53 having diametrically projecting arms 54 each provided with spaced fingers 55 directed rearwardly toward the forward end wall 14 of the body 10. The hub is mounted on a rotary longitudinally extending shaft 56 projecting through an opening 57 in the wall 14 and mounted in bearings 58 on the underside of the bottom 13. A wire 59 is stretched taut across the free terminals of each pair of fingers 55 so that upon each complete revolution of the shaft 56 and the knife 52, the cutting wires 59 will move transversely across the boss 34 to cut therefrom the subdivided extruded portion of the print of butter.

In order to provide means for rotating the shafts 50 and 56 to actuate the follower 40 intermittently and the cutting knife 52 continuously, the operating handle or crank 60 is connected to a transversely mounted drive shaft 61 mounted in bearings 62 on the bottom 13. The drive shaft 61 has secured thereon a bevel gear 63 which meshes with a bevel pinion 64 on the shaft 56 whereby the knife is rotated continuously with the drive shaft 61. A Geneva movement 65 through the intermeshing elements 66 and 67 intermittently drives the shaft 50 from the shaft 61 and is so timed that the arms 54 of the rotary knife pass transversely across the opening while the follower member 40 is at rest. In order to provide means for giving an audible signal when the follower 40 has completely extruded the print of butter and to thereby prevent straining of the mechanism by further operation of the crank or handle 60, a bell 68 is secured to the underside or bottom 13 of the body and a bell clapper 69 is secured to the rear end of the rack bar 47 by a flexible resilient stem 70 so that the clapper 69 engages a pin 71 in its path of movement immediately prior to the follower 40 reaching its outermost limit so that the clapper is tripped to strike the bell 68.

In order to provide means for receiving the pats or blocks of butter which are extruded and cut from the print, a receiving tray 72 is provided which is removably supported below the knife from the lower portion of the forward end wall 14. In order to further protect the knife and the outlet opening through which the butter is extruded from dust, dirt or other foreign matter, a covering member 73 is hinged as at 74 to the wall 14 and is provided with an open lower end 75 to allow for the dropping of the pats into the tray 72.

Figure 2:
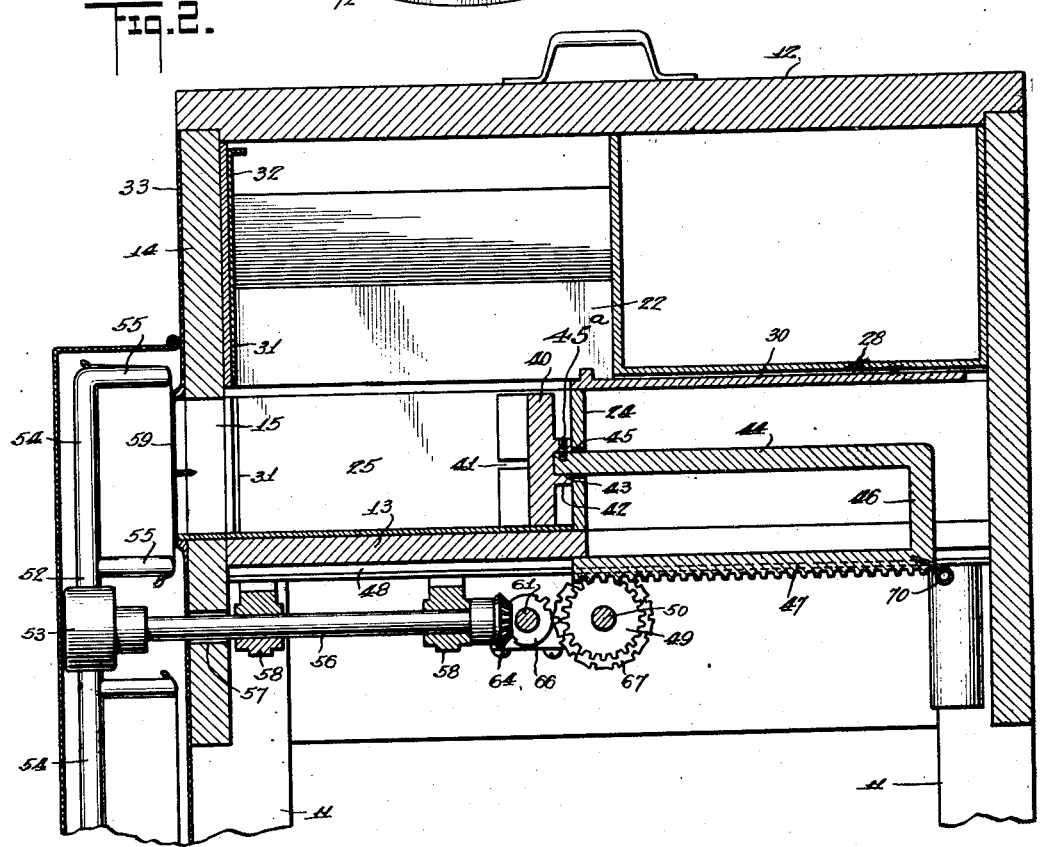
Fig. 2 is a fragmentary vertical longitudinal sectional view therethrough.
Figure 3:
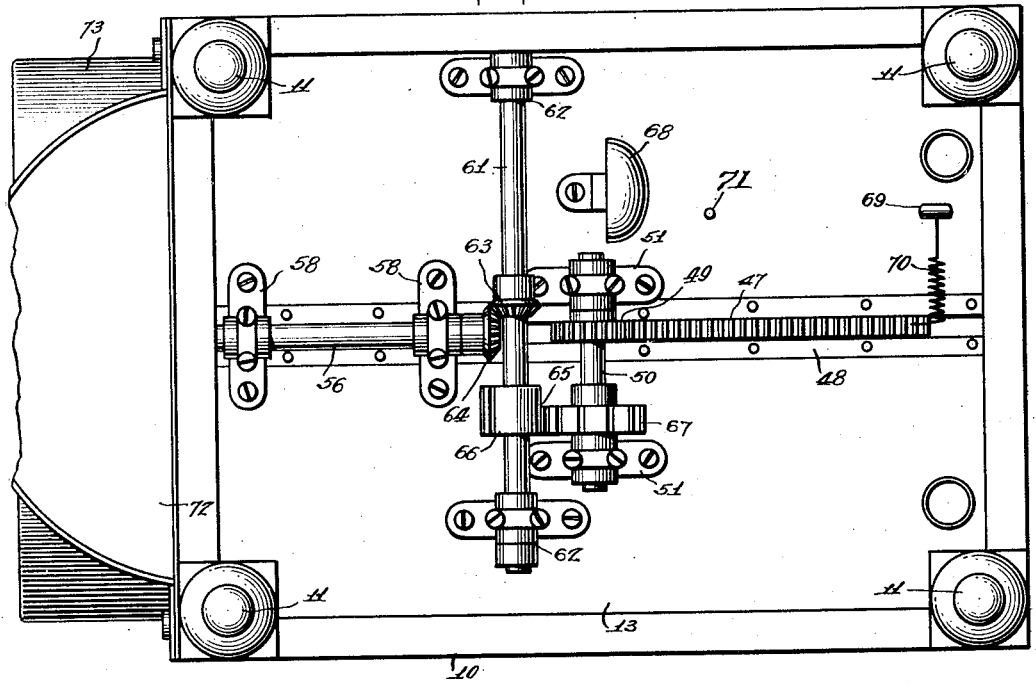
Fig. 3 is a bottom plan view.
Figure 4:
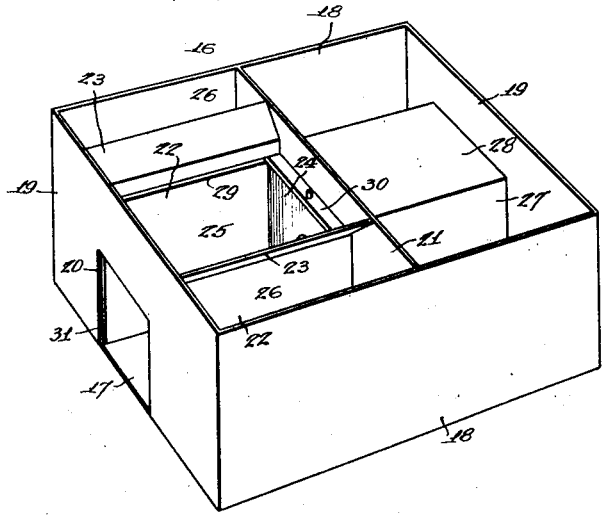
Fig. 4 is a perspective view of the removable partitioning member.
Figure 5:
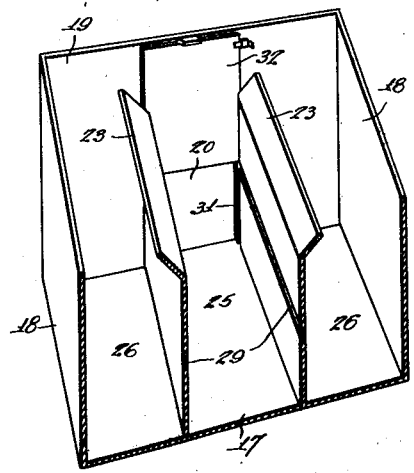
Fig. 5 is a sectional perspective view of said partitioning member.

When it is desired to remold or print scraps of butter, the vertically slidable closure plate 32 illustrated in Figs. 2 and 5, is moved downwardly to cover the opening 15, the follower 40 is retracted to its fullest extent and the scraps are introduced to the compartment 25 after which the longitudinally slidable cover plate is shifted to a position to overlie the compartment 25. The crank 60 is then manipulated to advance the follower 40 for remolding the scraps in the compartment.

In use and operation of the device for subdividing a print of butter into uniform pats, the follower is fully retracted as illustrated in Fig. 2; the print of butter is placed in the compartment 25 in advance of the follower 40 and the machine is ready for operation. By turning the crank handle 60 the follower 40 will be intermittently advanced to extrude intermittently portions of the forward end of the print through the openings 20 and 15 and the bossed opening 34 whereby the cross vertical and horizontal knives 35 and 36 will equally subdivide the print of butter longitudinally. The arms of the cutting knife 52 during the intermittent points of rest of the extruded end will move transversely thereacross to slice transversely the extruded longitudinally subdivided projecting end thereby cutting the pats or sections which will fall into the tray 72. It thus follows that each revolution of the crank 60 will effect two transverse cuttings and hence two sets of pats from the print. It is of course to be understood that a greater or lesser number of pats may be cut upon each rotation of the crank handle without in any way departing from the spirit or scope of the invention. In practice the compartments defined between the partition 21, rear wall 19 and the walls 18, 27 and 28 will serve as a convenient storage space for a supply of prints of butter while ice or any other suitable refrigerant will be placed in the compartments 26.

From the foregoing it will thus be seen that a comparatively simple, effective and inexpensive machine of the character set forth has been devised for expeditiously subdividing a block or print of butter into uniform individual pats.

I claim:

1. In a machine for subdividing a print of butter, including a casing, a lining member removably mounted in the casing subdivided to provide a compartment having an open top and an open end, the casing having an opening with which said open end is adapted to register, and means formed in the opening in the casing for subdividing the print when forced therethrough, a follower for forcing the print therethrough mounted in the compartment for longitudinal movement, the remaining subdivisions of the removable lining member constituting spaces for the reception of a refrigerant and a supply of butter prints, the removability of the lining member permitting of its withdrawal for the purpose of cleansing or storing the contents in a refrigerator when the machine is not in use.

2. In a machine of the character described, an outer casing having an opening in one of its end walls and crossed knives arranged in said opening, a lining member removably mounted in the casing and subdivided to provide a butter-receiving compartment formed with an open upper side and an open end adapted to register with the opening in the outer casing, a plunger arranged in the butter compartment for longitudinal movement toward the open end for extruding the butter to effect the longitudinal subdivision of the same by the crossed knives, a rotary transverse cutting device exterior of the opening in the outer casing for cutting the subdivided extruded sections of butter transversely, mechanism mounted on the under side of the outer casing including a common actuating shaft and operative connection between said shaft and the rotary transverse cutting device, and a plunger rod having operative connection with said common actuating shaft and detachable connection with the plunger, whereby removal of the lining member with its contents may be effected for storage of the same in a refrigerator and whereby the lining member may be thoroughly cleansed when removed.

REGINALD WILSON.